United States Patent
Fabbri et al.

(10) Patent No.: US 12,204,847 B2
(45) Date of Patent: Jan. 21, 2025

(54) SYSTEMS AND METHODS FOR TEXT SUMMARIZATION

(71) Applicant: Salesforce, Inc., San Francisco, CA (US)

(72) Inventors: Alexander R. Fabbri, New York, NY (US); Prafulla Kumar Choubey, San Jose, CA (US); Jesse Vig, Los Altos, CA (US); Chien-Sheng Wu, Mountain View, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/938,572

(22) Filed: Oct. 6, 2022

(65) Prior Publication Data

US 2023/0419017 A1 Dec. 28, 2023

Related U.S. Application Data

(60) Provisional application No. 63/355,323, filed on Jun. 24, 2022.

(51) Int. Cl.
*G06F 17/00* (2019.01)
*G06F 40/166* (2020.01)
(Continued)

(52) U.S. Cl.
CPC .......... *G06F 40/166* (2020.01); *G06F 40/284* (2020.01); *G06N 20/00* (2019.01)

(58) Field of Classification Search
CPC .... G06F 40/166; G06F 40/284; G06F 16/345; G06F 40/30; G06N 20/00; G06N 3/045; G06N 3/0455; G06N 3/0464; G06N 3/084
(Continued)

(56) References Cited

U.S. PATENT DOCUMENTS

| 10,943,181 B2* | 3/2021 | Shteingart | G06N 20/00 |
| 2011/0029477 A1* | 2/2011 | Tengli | G06N 5/02 706/54 |

(Continued)

OTHER PUBLICATIONS

Nguyen Thanh Nguyen; Improving Abstractive Summarization By Understanding Hidden Representations And Guidance On Semantic Meaning; Ulsan National Institute of Science and Technology; 2021; pp. 1-25.*

(Continued)

*Primary Examiner* — Andrew T McIntosh
(74) *Attorney, Agent, or Firm* — Haynes and Boone, LLP (57) ABSTRACT

Embodiments described herein provide a method for text summarization. The method includes receiving a training dataset having at least an uncompressed text, a compressed text, and one or more information entities accompanying the compressed text. The method also includes generating, using a perturber model, a perturbed text with the one or more information entities being inserted into the compressed text. The method further includes training the perturber model based on a first training objective, and generating, using the trained perturber model, a perturbed summary in response to an input of a reference summary. The method further includes generating, via an editor model, a predicted summary by removing information from the perturbed summary conditioned on a source document of the reference summary, and training the editor model based on a second training objective.

23 Claims, 7 Drawing Sheets

(51) Int. Cl.
*G06F 40/284* (2020.01)
*G06N 20/00* (2019.01)

(58) Field of Classification Search
USPC .......................................................... 715/254
See application file for complete search history.

(56) References Cited

U.S. PATENT DOCUMENTS

| | | | | |
|---|---|---|---|---|
| 2013/0282837 | A1* | 10/2013 | Mayala | H04L 51/52 709/206 |
| 2016/0062981 | A1* | 3/2016 | Dogrultan | G06F 40/221 704/9 |
| 2020/0081909 | A1* | 3/2020 | Li | G06F 40/258 |
| 2020/0272940 | A1* | 8/2020 | Sun | G06N 3/084 |
| 2021/0256160 | A1* | 8/2021 | Hachey | G06N 20/00 |
| 2021/0375269 | A1* | 12/2021 | Yavuz | G10L 15/063 |
| 2021/0390127 | A1* | 12/2021 | Fox | G06F 40/289 |
| 2022/0036232 | A1* | 2/2022 | Patel | G06F 8/60 |
| 2022/0229983 | A1* | 7/2022 | Zohrevand | G06N 20/00 |
| 2022/0237373 | A1* | 7/2022 | Singh Bawa | G06F 40/20 |
| 2022/0318593 | A1* | 10/2022 | Chen | G06F 40/284 |
| 2022/0382793 | A1* | 12/2022 | Hwang | G06F 16/345 |
| 2023/0004589 | A1* | 1/2023 | Wu | G06F 40/30 |
| 2023/0079879 | A1* | 3/2023 | Gunasekara | G06N 3/09 704/251 |
| 2023/0119109 | A1* | 4/2023 | Choubey | G06F 18/2155 706/12 |
| 2023/0376677 | A1* | 11/2023 | Choubey | G06N 3/045 |

OTHER PUBLICATIONS

Chen, Mingda, et al. "Summscreen: A dataset for abstractive screenplay summarization." arXiv preprint arXiv:2104.07091 (2021) (Year: 2021).*
Stiennon, Nisan, et al. "Learning to summarize with human feedback." Advances in Neural Information Processing Systems 33 (2020): 3008-3021 (Year: 2020).*
Miyato, Takeru, Andrew M. Dai, and Ian Goodfellow. "Adversarial training methods for semi-supervised text classification." arXiv preprint arXiv:1605.07725 (2016) (Year: 2016).*
Cao, Ziqiang, et al. "Faithful to the original: Fact aware neural abstractive summarization." Proceedings of the AAAI Conference on Artificial Intelligence. vol. 32. No. 1. 2018 (Year: 2018).*
Adam, Griffin et al. "Learning to Revise References for Faithful Summarization", Apr. 13, 2022, pp. 1-20, arXiv:2204.10290v1 [cs.CL].
Cao et al., "Factual error correction for abstractive summarization models", Proceedings of the 2020 Conference on Empirical Methods in Natural Language Processing (EMNLP), Nov. 16-20, 2020, pp. 6251-6258.
Dong et al., "Multi-fact correction in abstractive text summarization", Proceedings of the 2020 Conference on Empirical Methods in Natural Language Processing (EMNLP), Nov. 2020, pp. 9320-9331.
Filippova et al., "Overcoming the lack of parallel data in sentence compression", Proceedings of the 2013 Conference on Empirical Methods in Natural Language Processing, Oct. 2013, Seattle, Washington, pp. 1481-1491.
Gehrmann et al., "Bottom-up abstractive summarization", Proceedings of the 2018 Conference on Empirical Methods in Natural Language Processing, Oct.-Nov. 2018, Brussels, Belgium, pp. 4098-4109.
Goyal et al., "Annotating and modeling fine-grained factuality in summarization", Proceedings of the 2021 Conference of the North American Chapter of the Association for Computational Linguistics: Human Language Technologies, Jun. 6-11, 2021, pp. 1449-1462.
Hermann et al., "Teaching machines to read and comprehend", Advances in Neural Information Processing Systems 28: Annual Conference on Neural Information Processing Systems 2015, Dec. 7-12, 2015, Montreal, Quebec, Canada, pp. 1693-1701.
Kryscinski et al., "Evaluating the factual consistency of abstractive text summarization", Proceedings of the 2020 Conference on Empirical Methods in Natural Language Processing (EMNLP), Nov. 2020, pp. 9332-9346.
Lee et al., "Factual error correction for abstractive summaries using entity retrieval", Proceedings of the 2nd Workshop on Natural Language Generation, Evaluation, and Metrics (GEM), Dec. 2022, pp. 439-444.
Lin, "ROUGE: A package for automatic evaluation of summaries", Text Summarization Branches Out, Barcelona, Spain, pp. 74-81.
Liu et al., "RoBERTa: A Robustly Optimized BERT Pretraining Approach", http://arxiv.org/abs/1907.11692v1, 13 pages.
Narayan et al., "Don't give me the details, just the summary! Topic-aware convolutional neural networks for extreme summarization", Proceedings of the 2018 Conference on Empirical Methods in Natural Language Processing, Brussels, Belgium, Oct.-Nov. 2018, pp. 1797-1807.
Wan et al., "Factpegasus: Factuality-aware pre-training and fine-tuning for abstractive summarization", arXiv:2205.07830v1 [cs.CL] May 16, 2022, 19 pages.
Warstadt et al., "Neural network acceptability judgments", Transactions of the Association for Computational Linguistics, 2019, vol. 7, pp. 625-641.

* cited by examiner

| System | Summary |
|---|---|
| Source: | The oil price collapse sent global markets reeling throughout 2015. ... Brent crude oil was up 3% at $37.60 per barrel for the day but down 35% over the year. |
| Original | Wall Street markets closed lower in the last trading day of 2015 as oil prices languished at $28 a barrel for much of the year. |
| Entity Swap | No Change |
| Rewrite | Wall Street markets closed lower on the last trading day of 2015 as oil prices languished at $37.60 per barrel ... but remains down 35% over the year. |
| Delete | Wall Street markets closed lower on 2015 as oil prices languished at a for much of the year. |
| Compress (ours) | Wall Street markets closed lower as oil prices languished for much of the year. |

FIG. 6A

| Model | E-$P_{src}$ | BS-$P_{src}$ | $D_{arc}$ | QAFE | E-$R_{ref}$ | BS-$F1_{ref}$ | R1 | R2 | RL | R1-c | CoLA | Edit% |
|---|---|---|---|---|---|---|---|---|---|---|---|---|
| BART | 61.59 | 41.69 | 82.80 | 1.960 | 55.02 | 48.88 | 45.20 | 21.95 | 36.95 | 43.59 | 98.83 | - |
| BART-c | 80.42 | 44.39 | 89.53 | 2.161 | 41.47 | 44.83 | 41.10 | 17.63 | 33.10 | 41.32 | 98.81 | - |
| SpanFact (Dong et al., 2020) | 61.96 | 41.70 | 82.90 | 1.947 | 54.51 | 48.77 | 45.10 | 21.88 | 36.88 | 43.54 | 98.77 | 40.53 |
| SpanFact-c | 74.26 | 42.82 | 85.85 | 1.978 | 45.20 | 47.32 | 43.44 | 19.80 | 35.42 | 43.45 | 98.44 | 60.27 |
| CCGS (Chen et al., 2021) | 64.80 | 41.93 | 83.44 | 1.938 | 53.22 | 48.56 | 44.89 | 21.61 | 36.71 | 43.57 | 98.54 | 15.07 |
| ReDRESS (Adams et al., 2022) | 75.42 | 44.90 | 88.54 | 2.168 | 47.37 | 46.98 | 43.30 | 20.12 | 35.29 | 42.81 | 98.79 | 61.82 |
| FactPegasus (Wan and Bansal, 2022) | 98.71 | 42.82 | 90.82 | 2.082 | 35.76 | 44.39 | 41.98 | 18.30 | 34.45 | 43.98 | 93.25 | 67.05 |
| CompEdit (ours) | 80.02 | 43.03 | 88.35 | 2.124 | 44.49 | 47.00 | 43.45 | 20.29 | 35.63 | 43.61 | 98.61 | 54.31 |
| ReDRESS + CompEdit | 85.07 | 45.39 | 90.61 | 2.224 | 42.20 | 45.97 | 42.32 | 19.19 | 34.53 | 42.67 | 98.66 | 73.36 |

FIG. 6B

| Model | E-P$_{src}$ | BS-P$_{src}$ | D$_{arc}$ | R1 | R1-c |
|---|---|---|---|---|---|
| UntilM | 60.63 | 42.45 | 0.83 | 42.13 | 40.74 |
| FASumFC | 60.66 | 42.40 | 0.83 | 42.17 | 40.78 |
| ReDRESS | 76.01 | 46.28 | 0.90 | 40.73 | 40.33 |
| FactPegasus | 99.06 | 43.28 | 0.91 | 39.26 | 41.05 |
| CompEdit (ours) | 80.72 | 43.86 | 0.89 | 40.79 | 40.93 |
| ReDRESS + CompEdit | 78.44 | 45.43 | 0.92 | 39.17 | 39.46 |
| BottomUp | 43.31 | 31.38 | 0.41 | 26.90 | 26.28 |
| FASumFC | 44.76 | 32.09 | 0.43 | 28.19 | 27.50 |
| ReDRESS | 82.11 | 45.70 | 0.85 | 31.50 | 31.62 |
| FactPegasus | 91.35 | 31.65 | 0.49 | 26.78 | 26.71 |
| CompEdit (ours) | 79.74 | 34.13 | 0.54 | 27.65 | 28.40 |
| ReDRESS + CompEdit | 83.66 | 44.30 | 0.87 | 31.67 | 32.03 |

FIG. 6C

| Model | Consistent | Inconsistent |
|---|---|---|
| Unedited summaries | 441 | 62 |
| Cao et al. (2020) | 447 | 56 |
| Lee et al. (2022) | 446 | 57 |
| ReDRESS + CompEdit | 473 | 30 |

FIG. 6D

SYSTEMS AND METHODS FOR TEXT SUMMARIZATION

CROSS REFERENCE(S)

The instant application is a nonprovisional of and claim priority under 35 U.S.C. 119 to U.S. provisional application No. 63/355,323, filed Jun. 24, 2022, which is hereby expressly incorporated by reference herein in its entirety.

TECHNICAL FIELD

The embodiments relate generally to natural language processing and machine learning systems, and more specifically to systems and methods for text summarization.

BACKGROUND

Text summarization is employed to compress a longer text (e.g., a source document) into a shorter text that preserves the important information of the longer document. To improve factual consistency between the shorter text and the longer text, post-editing has been proposed to further edit the shorter text. However, the output of current post-editing models is susceptible to extrinsic entity errors or entities not mentioned/included in the longer text.

Therefore, there is a need for a more accurate text summarization mechanism.

BRIEF DESCRIPTION OF THE DRAWINGS

FIGS. 6A-6D provide various data plots illustrating example performance of the post-editing model for text summarization, according to some embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Existing natural language processing (NLP) models may be used to generate a summary of an input document. Such automatically generated summaries sometimes may contain inaccurate information, e.g., information that does not exist in the source document, or contradicts the semantic meaning of the source document. A post-editing approach for text summarization, can be employed to further edit the compressed version (e.g., a summary) of a longer text (e.g., a source document/article) to improve factual consistency, grammatical accuracy, etc. Post-editing models are employed to generate a post-edited text based on an input text. Post-editing models can improve factual consistency in the post-edited text.

Existing post-editing methods often focus on detecting and swapping inconsistent entities (e.g., individual names, business names, object names, event names, location names, etc.) with those accurate entities in the input. Using the post-editing of summaries as an example, the existing post-editing methods to swap inconsistent information entities include reranking the entity-replaced summaries, and selecting the most highly ranked summaries with replaced entity However, the post-edited summaries generated using these existing methods can hardly cure extrinsic entity errors, e.g., information entities not included/mentioned in the source document/article but are erroneously added into the summary.

In view of the need for a post-editing model that can improve the factual consistency in a post-edited text, embodiments described herein provide a post-editing model that removes extrinsic entity errors from the post-edited text, while retaining the essential information and form of the input text in the post-edited text. Specifically, the post-editing model/framework includes two models, a perturber model and an editor model. The perturber model is trained to insert information entities into an input text. The trained perturber model is then employed to generate training data for the editor model. The editor model is trained to remove information entities not included in the source document from its output text.

In one embodiment, sentence-compression data is used to train the perturber model to predict a perturbed text by inserting one or more information entities into a compressed text. The trained perturber model is then used to generate a perturbed summary, in response to an input of a reference summary. The perturbed summary is employed as the training data for the editor model. Using the training data, the editor model is trained to predict a predicted summary by removing information entities that have been inserted out of context from the source document of the reference summary from the perturbed summary. In some embodiments, the editor model is also trained to predict the predicted summary by removing other information entities not included in the source document. In some embodiments, the perturbed summary has a format of a sequence of tokens with special tokens, e.g., hashtags, identifying the inserted information entities not included in the reference summary. In the training of the editor model, the special tokens are employed for evaluating the training of the editor model and thus updating the parameters of the editor model. In one embodiment, summarization data is used as the training data for the editor model.

Computer and Network Environment

Figure 1:
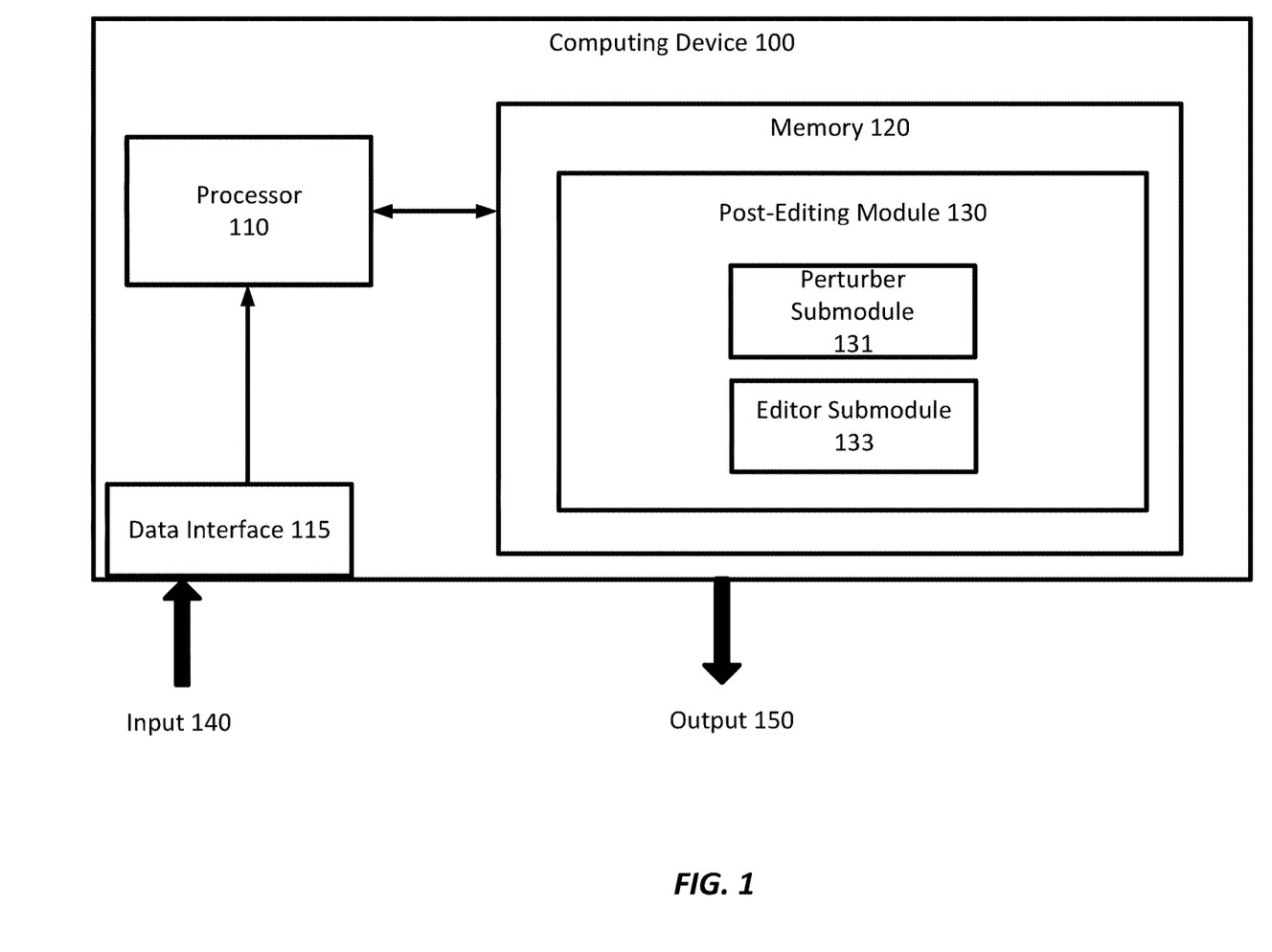
FIG. 1 is a simplified diagram illustrating a computing device implementing the text summarization described in FIGS. 3-5 and 6A-6D, according to one embodiment described herein.

FIG. 1 is a simplified diagram illustrating a computing device implementing the post-editing model described in FIGS. 3-5 and 6A-6D, according to one embodiment described herein. As shown in FIG. 1, computing device 100 includes a processor 110 coupled to memory 120. Operation of computing device 100 is controlled by processor 110. Although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a post-editing module 130 that may be used to implement and/or emulate the systems and models, and/or to implement any of the methods described further herein. Post-editing module 130 may receive input 140 such as an input training data (e.g., a compressed text, one or more information entities, and a corresponding uncompressed text) via the data interface 115 and generate an output 150 which may be a predicted summary (e.g., a predicted post-edited summary). Examples of the input data may include sentence-compression data (pairs of compressed text and corresponding uncompressed text), summarization data (pairs of reference summaries and corresponding source documents), and a testing summary. Examples of the output data may include predicted summaries of the reference summaries and/or a pruned summary of the testing summary.

The data interface 115 may include a communication interface, a user interface (such as a voice input interface, a graphical user interface, and/or the like). For example, the computing device 100 may receive the input 140 (such as a training dataset) from a networked database via a communication interface. Or the computing device 100 may receive the input 140, such as sentence-compression data, summarization data, and/or testing data from a user via the user interface.

In some embodiments, post-editing module 130 is configured to be trained to generate predicted summaries of reference summaries. Post-editing module 130 may further include a perturber submodule 131 and an editor submodule 133. Specifically, perturber submodule 131 is configured to train a perturber model (e.g., similar to perturber model 308 of FIG. 3) to generate a perturbed text. The editor submodule 133 is configured to generate a predicted summary using the training data, e.g., the perturbed summary and its corresponding source document. In some embodiments, the editor submodule 133 trains the editor model (e.g., similar to the editor model 410 of FIG. 4) to remove information entities not mentioned in the source document from the precited summary. In some embodiments, perturber submodule 131 and editor submodule 133 each applies testing data on the respective trained model. In one embodiment, post-editing module 130 and its submodules 131 and 133 may be implemented by hardware, software and/or a combination thereof.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
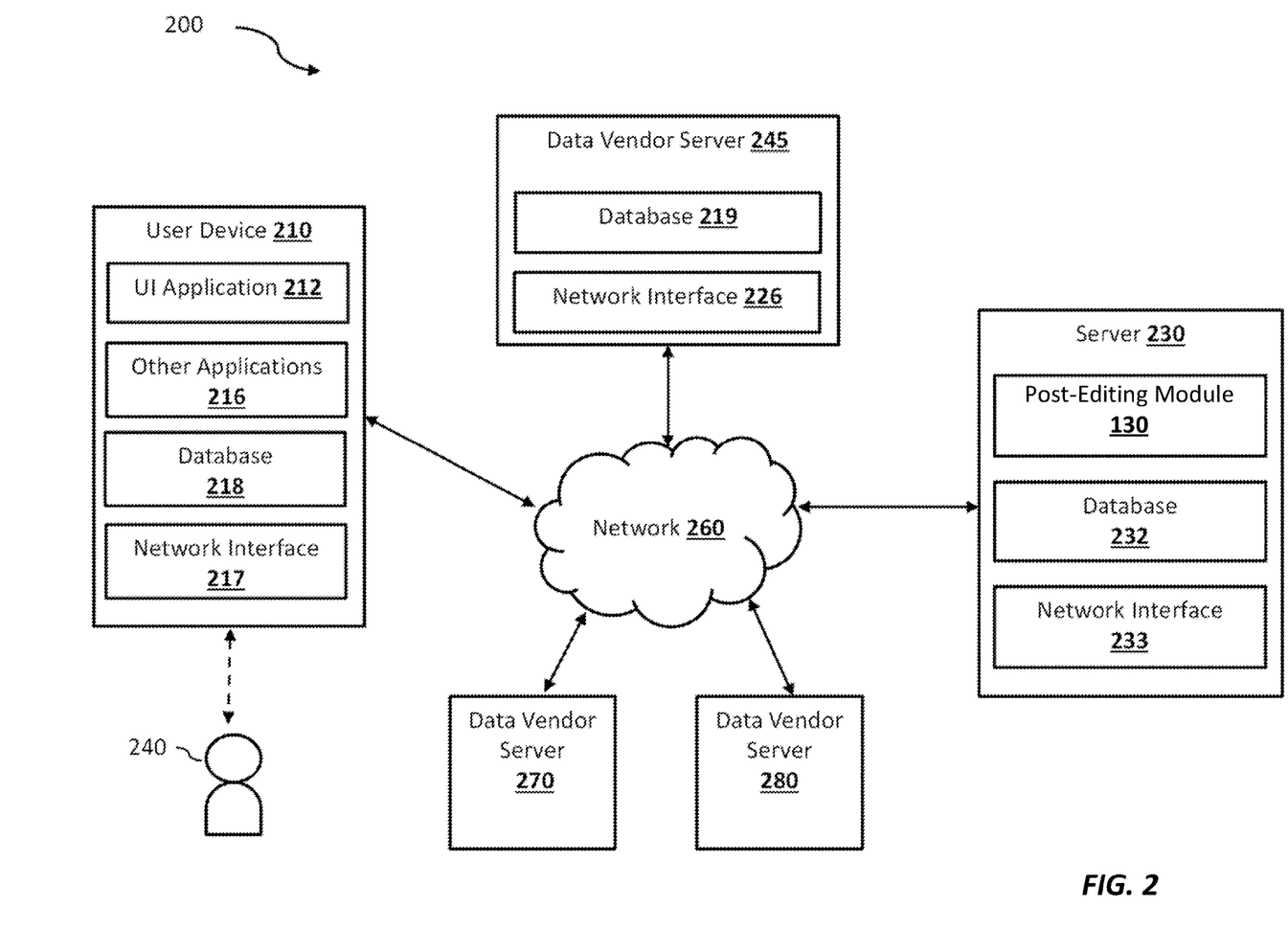
FIG. 2 is a simplified block diagram of a networked system suitable for implementing the text summarization framework described in FIGS. 3-5 and 6A-6D and other embodiments described herein.

FIG. 2 is a simplified block diagram of a networked system suitable for implementing the post-editing framework described in FIGS. 3-5 and 6A-6D and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of message communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating the result of a training process and/or an output of a post-edited summary from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a message of a revised summary from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the result of a training process and/or an output of a post-edited summary.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth®, and near field communication devices.

Data vendor server 245 may correspond to a server that hosts one or more of the databases 203a-n (or collectively referred to as 203) to provide training datasets including sentence-compression data, and summarization data to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth®, and near field communication devices. For example, in one implementation, the data vendor server 245 may send asset information from the database 203, via the network interface 226, to the server 230.

Server 230 may be housed with post-editing module 130 and its submodules described in FIG. 1. In some implementations, post-editing module 130 may receive data from database 219 at the data vendor server 245 via the network 260 to generate predicted summaries (e.g., post-edited summaries). The generated predicted summaries and/or a pruned testing summary may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of post-editing module 130. In one implementation, the database 232 may store previously generated perturbed text, perturbed summaries, predicted summaries, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Example Workflows

Figure 3:
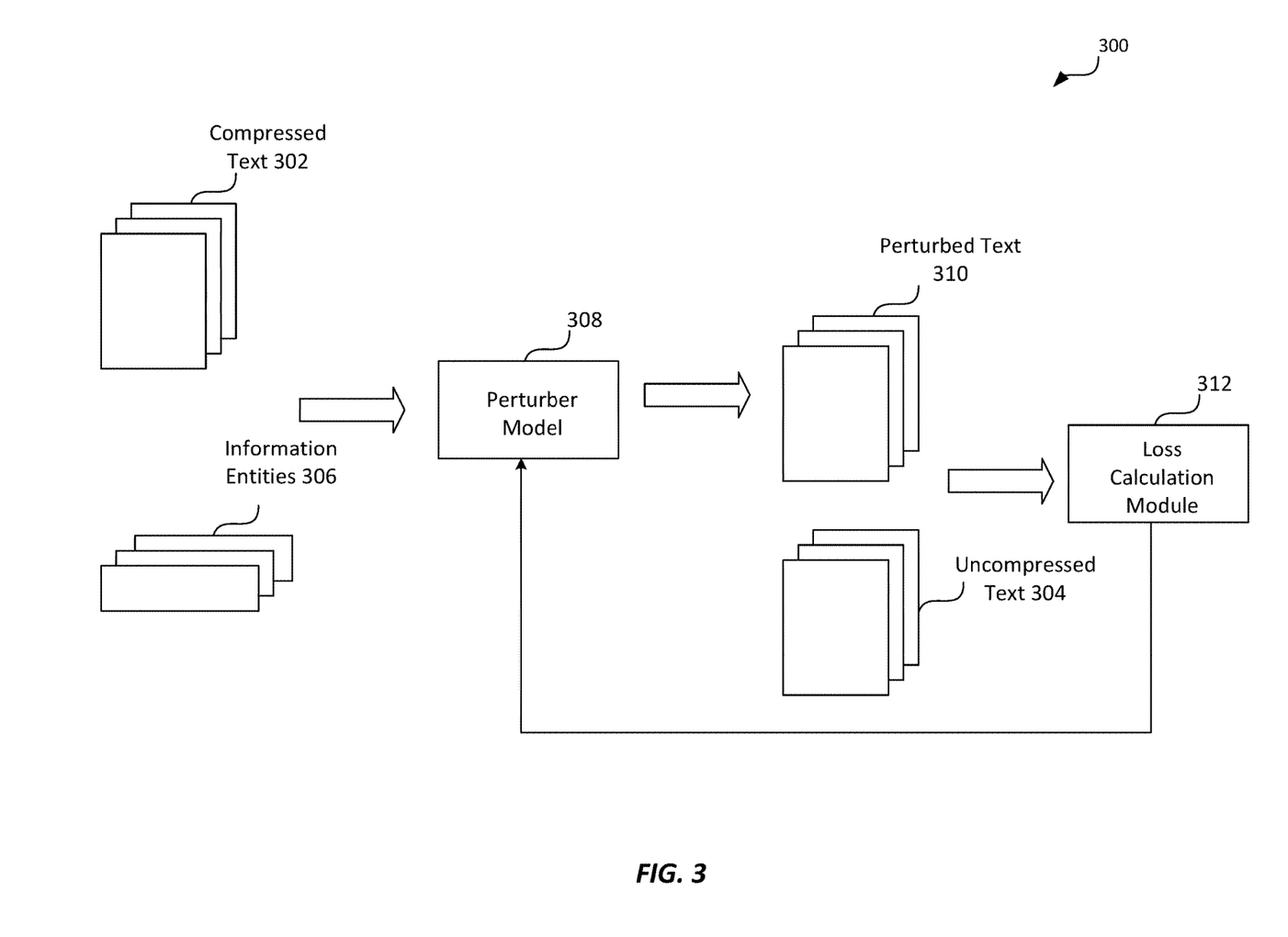
FIG. 3 is a simplified block diagram 300 illustrating a training of a perturber model of the text summarization framework, according to one embodiment described herein.

FIG. 3 shows an example block diagram 300 in which a perturber model 308 is trained to generate perturbed texts, according to embodiments of the present disclosure. Perturber model 308 may be trained to insert one or more information entities into a compressed text to generate a perturbed text. In some embodiments, sentence-compression data is used as the training data of perturber model 308. The sentence-compression data may include one or more pairs of a compressed text 302, a corresponding uncompressed text 304, and one or more information entities 306. Information entities 306 may not be mentioned/included in compressed text 302 but mentioned/included in uncompressed text 304. In each pair, compressed text 302 may be shorter than uncompressed text 304. For example, in each pair, the tokens (e.g., word tokens) included in uncompressed text 304 may be more than up to one third of those included in compressed text 302 (for example, compressed samples having a number of tokens less than 75% of the number of tokens in the uncompressed text may be filtered). In some embodiments, uncompressed text 304 may not include known factual errors. For example, uncompressed text 304 may be selected from a pool/subset of sentence-compression data that has been verified to have no known factual errors. In some embodiments, uncompressed text 304 may function as the ground-truth of the training data for perturber model 308.

As shown in FIG. 3, for the training of perturber model 308, perturber model 308 may receive the training data (e.g., the sentence-compression data of compressed text 302, uncompressed text 304, and information entities 306). Compressed text 302 and information entities 306 may be fed to perturber model 308 as input. Perturber model 308 may insert information entities 306 into compressed text 302 to generate a perturbed text 310. For example, the perturber model 308 may generate a next-token distribution of the perturbed text 310. Such distribution of the perturbed text 310 may then be compared with the uncompressed text 304 by a loss calculation module 312. Loss calculation module 312 may calculate a cross-entropy loss based on the difference between the predicted token (e.g., word token) distribution of perturbed text 310 and the token distribution of uncompressed text 304. The computed cross-entropy loss is then used to update to the perturber model 308 by backpropagation. In this way, the probability of P(Uncompressed text 304 | Compressed text 302, Information entities 306) is maximized through the training of perturber model 308.

In some embodiments, perturber model 308 may be trained to predict perturbed text 310 that is sufficiently similar to uncompressed text 304, and may include inserted information entities 306 and compressed text 302. In some embodiments, perturbed text 310 may also generate other information entities not included in compressed text 302, uncompressed text 304, or information entities 306. In some embodiments, perturber model 308 may be a denoising autoencoder, e.g., a Bart-large model, and the sentence-compression data may be selected from the compression data used in Filippova et al., Overcoming the lack of parallel data in sentence compression, Conference on Empirical Methods in Natural Language Processing, 1481-1491, 2013.

In an example, compressed text 302 consists of "It was the season in which Chelsea played by their own record book," uncompressed text 304 consists of "It was the $18^{th}$ season in which Chelsea played by their own record book in the Champions League," and the one or more information entities consists of "18" and "the Champions League." Perturber model 308 may generate perturbed text 310 by inserting "18" and "the Champions League" into "It was the season in which Chelsea played by their own record book." In some embodiments, when the training is complete, perturbed text 310 may consist of "It was the $18^{th}$ consecutive season in which Chelsea played by their own record book in the Champion League." In this example, perturbed text 310 may include all of information entities 306 (e.g., "18" and "the Champions League"), and may also generate information entity "consecutive" that is not included in compressed text 302, uncompressed text 304, or information entities 306.

Figure 4:
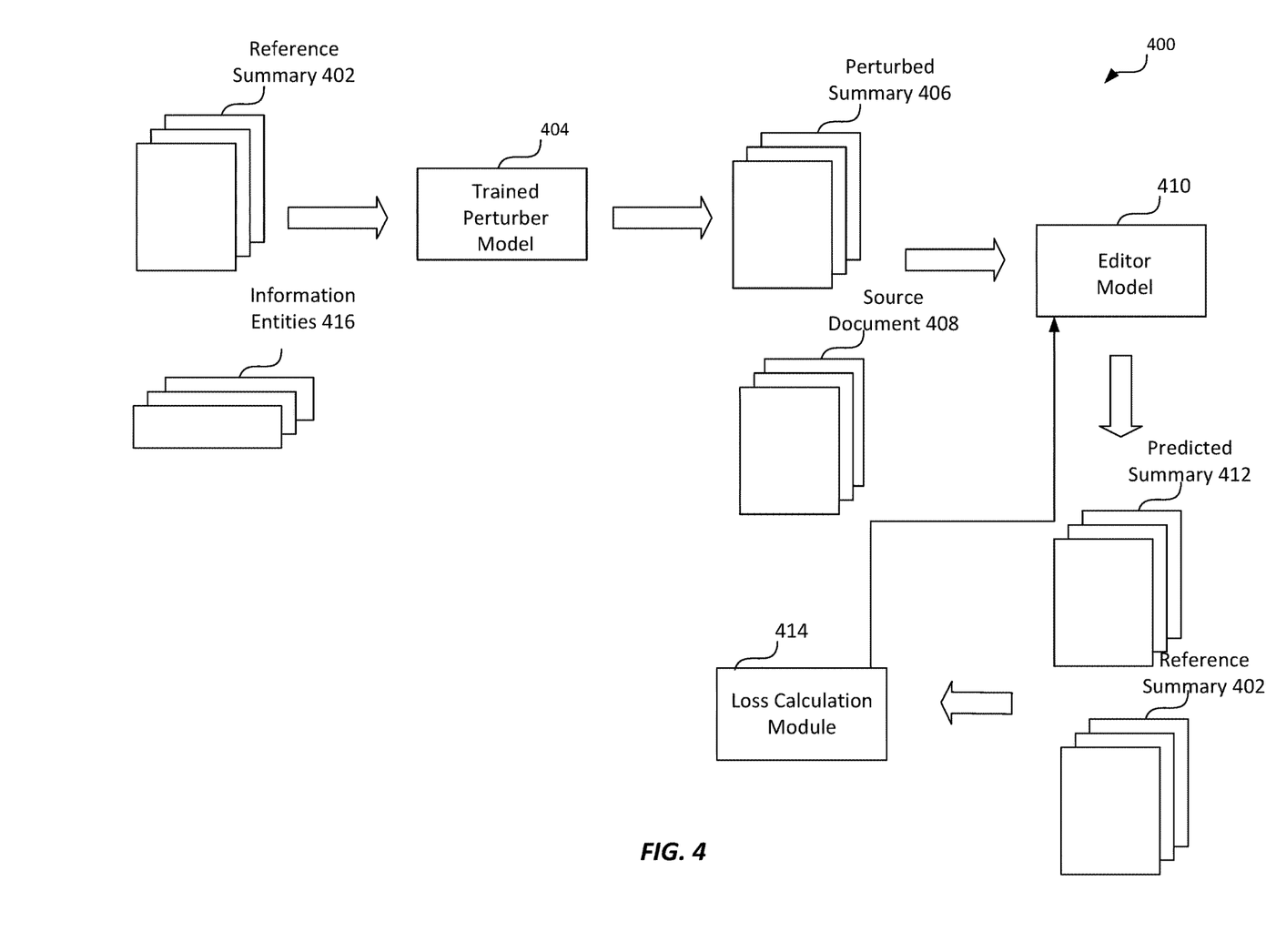
FIG. 4 is a simplified block diagram 400 illustrating a training of an editor model of the text summarization framework, according to one embodiment described herein.

After training, the trained perturber model 308 may be employed to generate training data for an editor model. FIG. 4 shows an example structure 400 that generates training data through a trained perturber model 404 and trains an editor model 410 using the training data to predict predicted summaries, according to embodiments of the present disclosure.

As shown in FIG. 4, after the training of perturber model 308 is complete, a reference summary 402 and at least one information entities 416 may be the input of trained perturber model 404 to generate a perturbed summary 406. Information entities 416 may not be mentioned/included in reference summary 402. Information entities 416 may be selected from source document 408 of reference summary 402 and may be inserted into reference summary 402 to generate perturbed summary 406. In this way, the random selection of information entities 416 to be inserted can ensure information entities 416 are on topic but out of context for generating the perturbed summary 406. Reference summary 402 may be part of a set of summarization data which includes one or more pairs of a reference summary and a corresponding source document, i.e., source document 408. In some embodiments, reference summary 402 do not include known factual errors. For example, reference summary 402 may be selected from a pool of summarization data and has been verified to have no known factual errors. Source document 408 may include a plurality of information entities.

In some embodiments, special tokens may be inserted into the perturbed summary 406 to signify the inserted entities, e.g., using hashtag "#". The special tokens may surround the information entities that need to be removed by editor model 410. In some embodiments, the special tokens may surround information entities 306 inserted by trained perturbed model 404. In some embodiments, the special tokens include hashtags, and the perturbed summary has a format of a sequence of tokens with hashtags identifying the inserted tokens (e.g., word tokens) corresponding to the inserted information entities (e.g., information entities 306). The special tokens may be used to evaluate the training of editor model 410.

Training data comprising the perturbed summary 406 may be employed to train editor model 410 to predict predicted summary 412. In some embodiments, the training data for editor model 410 may be the summarization data that includes reference summary 402 and source document 408. Specifically, perturbed summary 406 (e.g., generated from reference summary 402 by trained perturber model 404) and source document 408 may be fed into editor model 410. Reference summary 402, having no known factual errors, may be used as the ground-truth of the training data for editor model 410. Editor model 410 may generate a predicted summary 412 conditioned on the perturbed summary on source document 408, e.g., by removing one or more information entities from perturbed summary 406. The removed information entities may not be mentioned/included in source document 408. Predicted summary 412 and reference summary 402 may then be fed into a loss calculation module 414, which compares predicted summary 412 and reference summary 402. In some embodiments, loss calculation module 414 may compare a distribution of the sequence of tokens of predicted summary 412 (e.g., with special tokens) with the sequence of tokens of reference summary 402 to compute a cross-entropy loss, e.g., at the loss calculation module 414. The editor model 410 may then be updated based on the loss via backpropagation. In some embodiments, the probability of P (Reference summary 402 | Source document 408, Predicted summary 412) is maximized through the training of editor model 308.

In an example, reference summary 402 consists of "It was the season in which Chelsea played by their own record book," source document 408 includes an article that includes the content of reference summary 402 and other information entities, and perturbed summary 406 consists of "It was the ##18 ##th consecutive season in which Chelsea played by their own record book in ##the Champion League ##." The hashtags may surround information entities inserted into reference summary 402. Editor model 410 may be trained to predict predicted summary sufficiently similar to reference summary 402 by removing entities not in the source document 408, and/or information entities that are mentioned/included in source document 408 but out of context. In some embodiments, editor model 410 is trained to move information entities surrounded by hashtags (e.g., inserted information entities 416) and information entities generated by trained perturber model 404. In an example, editor model 410 may be trained to remove "18" and "the Champion League," both of which are inserted information entities 416. Editor model 410 may be trained to further remove information entities not included/mentioned in source document 408. For example, editor model 410 may remove "consecutive" and "th," both of which are generated automatically by trained perturber model 404. In an example, predicted summary 406 consists of "It was the season in which Chelsea played by their own record book."

In some embodiments, editor model 410 may be a denoising autoencoder, e.g., a B art-large model, and the training summarization data may be selected from the data set described in Filippova et al. In some embodiments, the training summarization data is a summarization dataset that includes source documents (e.g., 408) and reference summaries (e.g., 402) of the source documents, rather than a sentence compression dataset, which includes sentences and corresponding compressed sentences. Examples of the training summarization data may include XSum (Narayan et al., Don't Give Me The Details, Just The Summary! Topic-Aware Convolutional Neural Networks For Extreme Summarization, Proceedings of the 2018 Conference on Empirical Methods in Natural Language Processing, 1797-1807, 2018) and CNN/DM (Hermann et al., Teaching Machines to Read and Comprehend, Advances in Neural Information Processing Systems 28: Annual Conference on Neural Information Processing Systems 2015, 1693-1701, 2015).

In some embodiments, alternatively or optionally, suitable sentence-compression data, including pairs of a shorter text, a corresponding longer text, and one or more information entities, may be used as (or to generate) the training data of editor model 410. For example, trained perturber model 404 may be applied on the shorter text (instead of reference summary 402) and information entities 416 to generate a second perturbed text. The second perturbed text and the longer text may be fed into editor model 410 to train editor model 410 to predict a predicted text. The detailed description of using a pair of shorter text and a longer text for the training of editor model 410 can be referred to that of the reference summary and source document, and is not repeated herein.

In various embodiments, compressed text 302 and reference summary 402 may be the same or different, and perturbed text 310 and perturbed summary 406 may be the same or different. For example, a reference summary may be employed as a compressed text for the training of perturber model, as illustrated in the examples of the present disclosure. In another example, reference summary 402 is different from compressed text 302 and may be non-overlapping versus compressed text 302. The scope of the present disclosure should not be limited by the embodiments of the present disclosure.

It should also be noted that, although the examples of the present disclosure are illustrated in light of summaries (e.g., post editing of summaries), any suitable pairs of a shorter text and a longer text can be employed in the training and the application of the models (e.g., the perturber model and the editor model). The longer text may include information entities not mentioned/included in the short text. The trained post-editing model can be employed for post-editing of any suitable text with a corresponding longer text (e.g., a source document/article).

In some embodiments, after editor model 410 is trained, a testing summary and a corresponding testing source document may be inputted into the trained editor model. In response to the input, the trained editor model may generate a pruned summary conditioned on the test source document. For example, the trained editor model may remove information entities not included in the source document from the testing summary.

Figure 5:
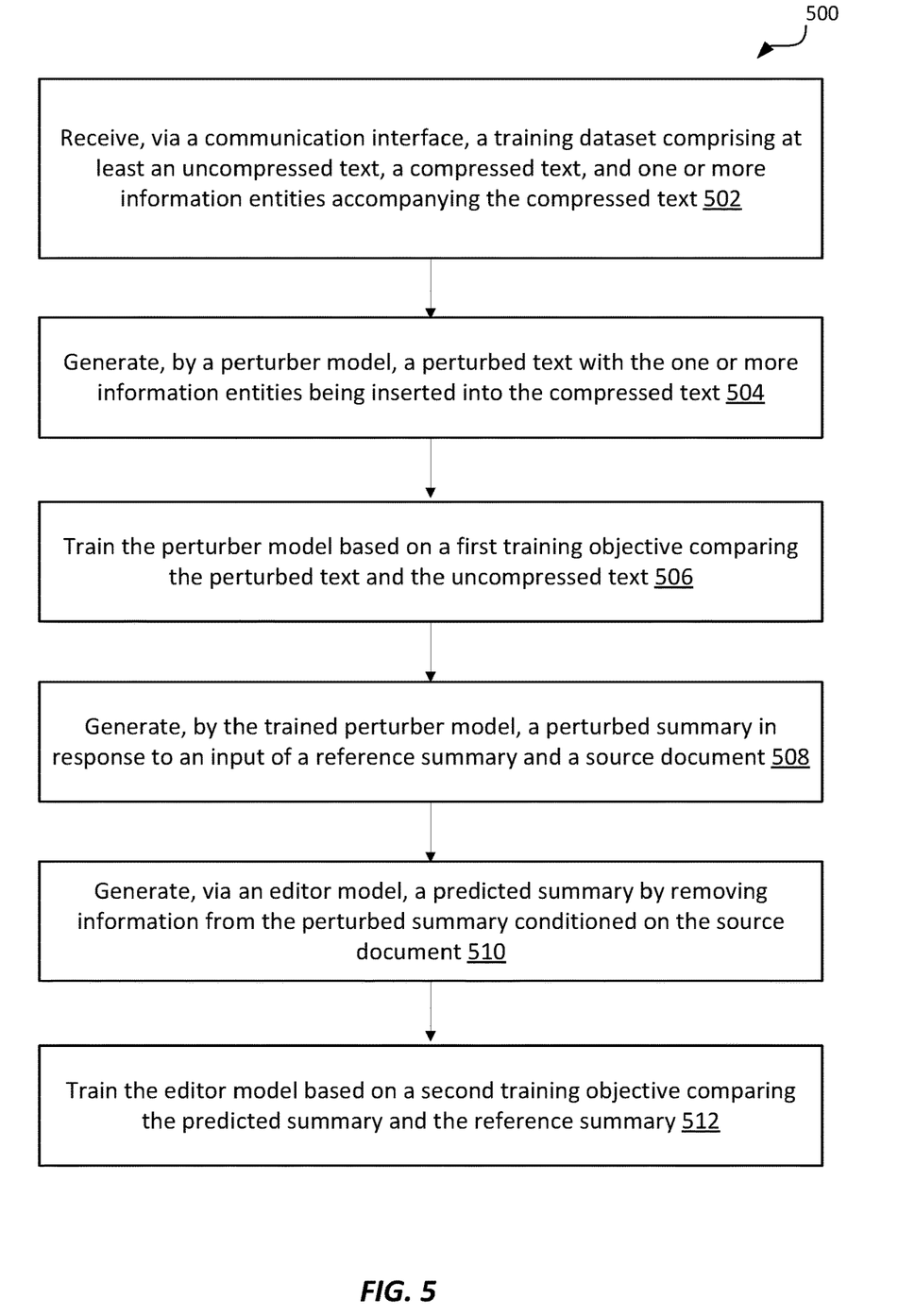
FIG. 5 provides a simplified logic flow diagram illustrating a method of text summarization, according to some embodiments described herein.

FIG. 5 is an example logic flow diagram illustrating a method of post-editing based on the framework shown in FIGS. 3, 4, and 6A-6D, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of post-editing module 130 (e.g., FIGS. 1-2) that performs post-editing of text.

At step 502, a training data set including at least an uncompressed text (e.g., 304 in FIG. 3), a compressed text (e.g., 302 in FIG. 3), and one or more information entities (e.g., 306 in FIG. 3) accompanying the compressed text is received via a communication interface (e.g., 115 in FIG. 1). In one implementation, the one or more information entities are not mentioned in the uncompressed text. In one implementation, the one or more information entities are randomly selected from a pool of information entities that is overlapping with the uncompressed text and non-overlapping with the compressed text.

At step 504, a perturbed text (e.g., 310 in FIG. 3) is generated by a perturber model (e.g., 308 in FIG. 3) with the one or more information entities inserted into the compressed text. In one implementation, the perturber model includes a denoising autoencoder.

At step 506, the perturber model is trained based on a first training objective comparing the perturbed text and the uncompressed text. In one implementation, the first training objective is a cross-entropy loss between a predicted token distribution of the perturbed text and a token distribution of the uncompressed text.

In one implementation, the method further includes receiving, at the trained editor model, a testing summary and a test source document. The method may also include generating, by the trained editor model, a pruned summary conditioned on the test source document.

At step 508, a perturbed summary (e.g., 406 in FIG. 4) is generated by the trained perturber model (e.g., 404 in FIG. 4) in response to an input of a reference summary (e.g., 402) and a source document (e.g., 408 in FIG. 4). In one implementation, the perturbed summary is generated by inserting information into the reference summary. In some implementations, at least a portion of the inserted information entities may not be mentioned in the source document. In some implementations, at least a portion of the inserted information entities are mentioned in the source document but not mentioned in the reference summary. In one implementation, the perturbed summary has a format of a sequence of tokens with hashtags identifying inserted tokens corresponding to inserted one or more information entities that do not belong to the reference summary.

At step 510, a predicted summary (e.g., 412 in FIG. 4) is generated by an editor model (e.g., 410 in FIG. 4) by removing information from the perturbed summary conditioned on the source document. In one implementation, the information removed from the predicted summary includes a plurality of information entities not mentioned in the source document. In one implementation, the editor model comprises a denoising autoencoder.

At step 512, the editor model is trained based on a second training objective comparing the predicted summary and the reference summary. In one implementation, the training the editor model includes computing a cross-entropy loss between a predicted token distribution of the predicted summary conditioned on the source document and a token distribution of the reference summary, and updating the editor model based on the cross-entropy loss via backpropagation.

Figure 6C:
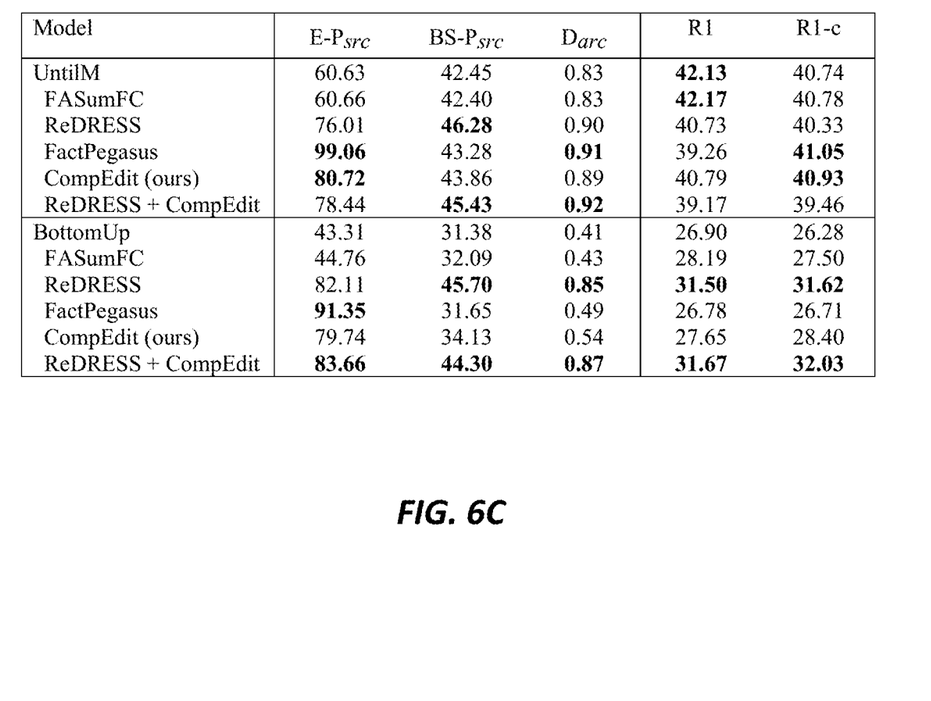

FIGS. 6A-6D provide various data plots illustrating example performance of the post-editing model in data experiments. FIG. 6A illustrates post-edited summaries generated by the disclosed post-editing model and other existing post-editing models. "Source" represents the source article, e.g., source document, and "Summary" represents the summaries of the source. Specifically, "Original" represents a summary of the source without post-editing, "Entity Swap" represents a post-edited summary of the source using an entity swapping-based model, "Rewrite" represents a post-edited summary of the source using a rewrite model, "Delete" represents a post-edited summary of the source using a deletion-based model, and "Compressed(ours)" represents the post-edited summary using the disclosed post-editing model.

As shown in FIG. 6A, existing work in post-editing for factual consistency has focused on swapping inconsistent entities with those in the input Lee et al., Factual error correction for abstractive summaries using entity retrieval, 2022), including by reranking the entity-replaced summaries, autoregressive approaches that learn to rewrite and remove perturbations from the input Adams et al., Learning to Revise References for Faithful Summarization, 2022), or deletion-based editing of references (Wan and Bansal, Fact-pegasus: Factuality-Aware Pre-Training and Fine-Tuning For Abstractive Summarization, 2022). FIG. 6A shows example outputs of these approaches that demonstrate potential downsides. For summaries in datasets such as XSum (Narayan et al., Don't Give Me The Details, Just The Summary! Topic-Aware Convolutional Neural Networks For Extreme Summarization, Proceedings of the 2018 Conference on Empirical Methods in Natural Language Processing, 1797-1807, 2018) that contain extrinsic entity errors in up to 70% of reference and generated summaries, a suitable entity replacement is often not available from the source. In contrast, the disclosed post-edited summary provides a well-formed summary through controlled compression.

Results of applying post-editing models to BART on XSum are shown in FIG. 6B. Bart-large is applied as the base summarization model, and post-editing models are applied to the output of the base model. It is noted that BART-c (i.e., Bart-large model trained on a data subset without extrinsic entity errors) improves across all factual consistency metrics compared to BART at the cost of ROUGE (Lin, ROUGE: A Package for Automatic Evaluation of Summaries, Text Summarization Branches Out, 74-81, 2004) and other informativeness metrics. In some embodiments, the data subset without extrinsic entity errors is the subset in which all named entities found in the reference summary are present in the source document. SpanFact is a Bart-large model by Dong et al. (2020) that takes in the source document and the summary with entity slots masked and fills the masked slots. SpanFact-c is the Bart-large model trained on data subset without extrinsic entity errors. CCGS is a model by Chen et al. (2021) that generates candidate summaries all ways to replace summaries entities with similar-typed input entities and training BART with a classification layer to re-rank the candidate summaries. ReDRESS is a model by Adams et al. (2022) that includes a perturber learning to corrupt a summary by using entity swaps between the input and a retrieved set of entities, span deletion, and shuffling as training data. Fact-Pegasus is a model by Wan and Bansal (2022) that is based on deletion and removes extrinsic entity error tokens and surrounding words based on manually-defined rules over the dependency parse of the summary.

In some embodiments, standard ROUGE-1/2/L (R-1/2/L) is employed for the evaluation of different approaches. A variation called R1-c is included to evaluate R1 on the reference summaries with entities not found in the input removed from the summary. The percentage of the base model summaries that are edited by the post-editor (Edit %) and the following metrics are included E-Psrc (E-Rref) measures the percentage of entities in the generated summary (reference) present in the input (generated summary). E-Psrc as a metric performs on par with model-based, token-level metrics. BS-Psrc (BS-F1ref) represents the BERTScore precision (F1) w.r.t. the source article (reference summary). Darc measures the percentage of dependency arcs in summary entailed by the source article using the model from Goyal and Durrett (Annotating and Modeling Fine-Grained Factuality in Summarization, Proceedings of the 2021 Conference of the North American Chapter of the Association for Computational Linguistics: Human Language Technologies, 1449-1462, 2021). QAFE is the QAFactEval question answering-based consistency metric. CoLA (Warstadt et al., Neural Network Acceptability Judgements, Transactions of the Association for Computational Linguistics, 7:625-641, 2019) represents a dataset. To evaluate grammaticality, a ROBERTa-large model is trained on the CoLA dataset, which includes sentences and labels for their grammatical acceptability.

As shown in FIG. 6B, it is found that SpanFact does not improve factual consistency, as this model is trained to fill in entity masks on the original, noisy dataset, but SpanFact-c improves factual consistency. While CCGS does improve factual consistency slightly, the model only edits a small percentage of the summaries (Edit % of about 15). ReDRESS performs better than SpanFact-c on factual consistency and also E-R re f, which aligns with its rewriting objective that can insert semantically relevant entities. FactPegasus improves entity precision by definition (it is not 100 due to differences in entity processing), but it is the only post-editor that decreases grammaticality by a noticeable margin. The CompEdit model (i.e., the disclosed post-editing model) improves factual consistency, and further improvements is observed when the disclosed post-editing model is applied on top of the ReDRESS. ReDRESS as a first-stage corrector can insert suitable replacement entities while the second-stage compressor may remove any remaining entity errors. CompEdit does not remove all entity errors in the summaries, and a qualitative inspection revealed that common world knowledge tokens, such as names of world leaders, were often left unchanged. It is noted that note that vanilla ROUGE scores do decrease along with improvements in factual consistency. However, R1-c actually shows improvements when applying FactPegasus or CompEdit, showing that much of the loss in vanilla R1 is due to factual inconsistencies in the references.

FIG. 6C shows the results of applying the above post-editors on non-BART models. Large improvements over Zhu et al. (2021) have been found. A gain in R1-c and entity precision is observed when applying CompEdit to the pre-trained UniLM (Dong et al., Unified Language Model Pre-training for Natural Language Understanding and Generations, Advances in Neural Information Processing Systems 32: Annual Conference on Neural Information Processing Systems 2019, NeurIPS 2019, 13042-13054, 2019), showing the benefits of the disclosed compression-based method when the underlying model contains relatively high-quality summaries. ReDRESS shows a large performance increase on BottomUp (Gehrmann et al., Bottom-Up Abstractive Summarization, Proceedings of the 2018 Conference on Empirical Methods in Natural Language Processing, 4098-4109, 2018). The ability of ReDRESS to completely rewrite the summary allows it to improve the non-pretrained, lower-quality summaries that require editing beyond just compression. There is also a benefit from the combination of ReDRESS and CompEdit in terms of entity precision for the BottomUp model, which has been shown to contain a high proportion of entity errors and inconsistencies.

Figure 6D:
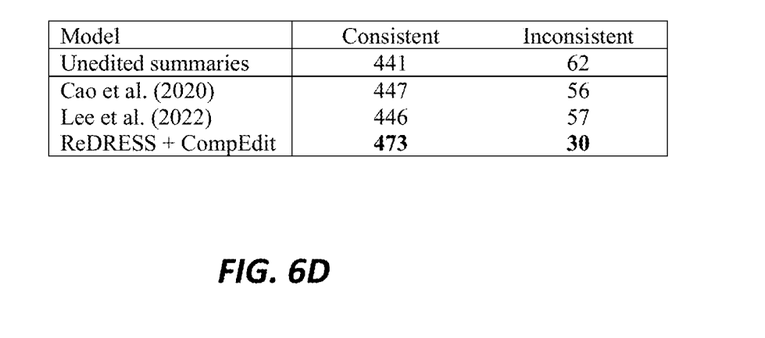

FIG. 6D shows the manually-annotated results of post-editing a non-pretrained model from the CNN/DM-based (Hermann et al., Teaching Machines to Read and Comprehend, Advances in Neural Information Processing Systems 28: Annual Conference on Neural Information Processing Systems 2015, 1693-1701, 2015), FactCC (Kryscinski et al., Evaluating the Factual Consistency of Abstractive Text Summarization, Proceedings of the 2020 Conference on Empirical Methods in Natural Language Processing, 9332-9346, 2020) test dataset. The previously-reported results, e.g., an autoregressive post-editor trained on entity swaps and back-translated paraphrases by Cao et al., (2020), and a method that substitutes entities from retrieved source sentences by Lee et al., (2022) are compared. Because extrinsic entity errors, for which CompEdit and FactPegasus are designed, constitute only a small proportion of errors in this dataset, only ReDRESS+CompEdit is included in the framework. CompEdit was applied to the ReDRESS outputs containing extrinsic entity errors, 2.5% of edited summaries, all of which were then labeled factually consistent. A large improvement can be observed in consistent summaries and similar trends in the benefit of ReDRESS and adding CompEdit as the above results on the non-pretrained BottomUp model.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for text summarization, the method comprising:
   receiving, via a communication interface, a training dataset comprising at least an uncompressed text, a compressed text, and one or more information entities that are not mentioned in the compressed text but included in the uncompressed text;
   generating, by a perturber model, a perturbed text based on inserting at least a first information entity from the one or more information entities into the compressed text;
   training the perturber model based on a first training objective comparing the perturbed text generated from the compressed text and the at least first information entity, and the uncompressed text including the one or more information entities;
   generating, by the trained perturber model, a perturbed summary in response to an input of a reference summary and at least a second information entity randomly selected from a corresponding source document of the reference summary;

generating, via an editor model, a predicted summary by removing information from the perturbed summary conditioned on the source document of the reference summary; and training the editor model based on a second training objective of a cross-entropy loss between a predicted token distribution of the predicted summary conditioned on the source document and a token distribution of the reference summary.

2. The method of claim 1, wherein the one or more information entities are not mentioned in the compressed text.

3. The method of claim 1, wherein the information removed from the predicted summary comprises a plurality of information entities not mentioned in the source document.

4. The method of claim 1, wherein the first training objective is a cross-entropy loss between a predicted token distribution of the perturbed text and a token distribution of the uncompressed text.

5. The method of claim 1, wherein the perturbed summary is generated by inserting information into the reference summary, and wherein at least a portion of the inserted information entities is randomly selected from the source document but not present in the reference summary.

6. The method of claim 1, wherein the perturbed summary has a format of a sequence of tokens with hashtags identifying inserted tokens corresponding to inserted one or more information entities that do not belong to the reference summary.

7. The method of claim 1, wherein the training the editor model further comprises updating the editor model based on the cross-entropy loss via backpropagation.

8. The method of claim 1, further comprising:
receiving, at the trained editor model, a testing summary and a test source document; and
generating, by the trained editor model, a pruned summary conditioned on the test source document.

9. The method of claim 1, wherein:
the perturber model comprises a denoising autoencoder; and
the editor model comprises a denoising autoencoder.

10. The method of claim 1, wherein the one or more information entities are randomly selected from a pool of information entities that is overlapping with the uncompressed text and non-overlapping with the compressed text.

11. The method of claim 1, wherein the generating of the perturbed text with the one or more information entities comprises the inserting of one or more information entities into the compressed text without swapping with the one or more information entities.

12. The method of claim 1, wherein the generating of the predicted summary comprises the removing of the information entities from the perturbed summary without swapping the information.

13. The method of claim 1, wherein:
training data of the perturber model comprises a set of sentence-compression data, and the set of sentence-compression data comprises one or more pairs of a compressed text, a corresponding uncompressed, and one or more perturber information entities; and
the uncompressed text contains the compressed text and the one or more information entities.

14. The method of claim 1, wherein a number of tokens in the uncompressed text is more a number of tokens in the compressed text by up to one third of the number of tokens in the compressed text.

15. A system for text summarization, the system comprising:
a communication interface that receives a training dataset comprising at least an uncompressed text, a compressed text, and one or more information entities that are not mentioned in the compressed text;
a memory storing a plurality of processor-executable instructions; and
a processor executing the instructions to perform operations comprising:
generating, by a perturber model, a perturbed text based on inserting at least a first information entity from the one or more information entities into the compressed text;
training the perturber model based on a first training objective comparing the perturbed text generated from the compressed text and the at least first information entity and the uncompressed text including the one or more information entities;
generating, by the trained perturber model, a perturbed summary in response to an input of a reference summary and at least a second information entity randomly selected from a corresponding source document of the reference summary;
generating, via an editor model, a predicted summary by removing information from the perturbed summary conditioned on the source document of the reference summary; and
training the editor model based on a second training objective of a cross-entropy loss between a predicted token distribution of the predicted summary conditioned on the source document and a token distribution of the reference summary.

16. The system of claim 15, wherein the one or more information entities are not mentioned in the compressed text.

17. The system of claim 15, wherein the information removed from the predicted summary comprises a plurality of information entities not mentioned in the source document.

18. The system of claim 15, wherein the first training objective is a cross-entropy loss between a predicted token distribution of the perturbed text and a token distribution of the uncompressed text.

19. The system of claim 15, wherein the perturbed summary is generated by inserting information into the reference summary, and wherein at least a portion of the inserted information entities is randomly selected from the source document but not present in the reference summary.

20. The system of claim 15, wherein the perturbed summary has a format of a sequence of tokens with hashtags identifying inserted tokens corresponding to inserted one or more information entities that do not belong to the reference summary.

21. The system of claim 15, wherein the training the editor model further comprises updating the editor model based on the cross-entropy loss via backpropagation.

22. The system of claim 15, further comprising:
receiving, at the trained editor model, a testing summary and a test source document; and
generating, by the trained editor model, a pruned summary conditioned on the test source document.

23. A non-transitory processor-readable storage medium storing a plurality of processor-executable instructions for code program synthesis for a target problem, the instructions being executed by one or more hardware processors to perform operations comprising:

receiving, via a communication interface, a training dataset comprising at least an uncompressed text, a compressed text, and one or more information entities that are not mentioned in the compressed text;

generating, by a perturber model, a perturbed text based on inserting at least a first information entity from the one or more information entities into the compressed text;

training the perturber model based on a first training objective comparing the perturbed text generated from the compressed text and the at least first information entity and the uncompressed text including the one or more information entities;

generating, by the trained perturber model, a perturbed summary in response to an input of a reference summary and at least a second information entity randomly selected from a corresponding source document of the reference summary;

generating, via an editor model, a predicted summary by removing information from the perturbed summary conditioned on the source document of the reference summary; and training the editor model based on a second training objective of a cross-entropy loss between a predicted token distribution of the predicted summary conditioned on the source document and a token distribution of the reference summary.

* * * * *